United States Patent [19]

Agricola et al.

[11] 4,245,339
[45] Jan. 13, 1981

[54] TELECOMMUNICATION SWITCHING NETWORK HAVING A MULTISTAGE REVERSED TRUNKING SCHEME

[75] Inventors: Manfred Agricola; Willfried Krautkrämer, both of Frankfurt; Karl-Heinz Reimer, Ober-Roden, all of Fed. Rep. of Germany

[73] Assignee: Telefonbau und Normalzeit, GmbH, Fed. Rep. of Germany

[21] Appl. No.: 31,758

[22] Filed: Apr. 20, 1979

[30] Foreign Application Priority Data

Apr. 29, 1978 [DE] Fed. Rep. of Germany ....... 2819126

[51] Int. Cl.³ .......................................... H04Q 11/04
[52] U.S. Cl. .................................................. 370/58
[58] Field of Search ................... 179/15 AT, 15 AQ; 370/65, 59, 63, 58

[56] References Cited

U.S. PATENT DOCUMENTS

| | | | |
|---|---|---|---|
| 4,025,725 | 5/1977 | Euler | 179/15 AT |
| 4,035,584 | 7/1977 | Lurtz | 179/15 AT |
| 4,045,617 | 8/1977 | Schlichte | 179/15 AT |
| 4,064,370 | 12/1977 | Coonce et al. | 179/15 AT |
| 4,146,748 | 3/1979 | Troost et al. | 179/15 AT |

*Primary Examiner*—Douglas W. Olms
*Attorney, Agent, or Firm*—Jacobson and Johnson

[57] ABSTRACT

The switching network having a reversed trunking scheme of a PCM-(pulse code modulated -) exchange is formed by a first (time division) switching stage (A) consisting of individual switching groups (G 1 to G m) combined into one major switching group (GG), a second (space division) switching Stage (B1) formed by a number of PCM-lines equal to the number of switching groups (G 1 to G m) within one major switching group (GG), whereby each switching group is connected with a PCM-line in the outgoing direction, whereas a switching group individual multiplexer (M) performing the access of all PCM-lines to each switching group (G) and a third (space division) switching stage (B2) formed by a number of PCM-lines equal to the number of major switching groups (GG), the bitrate on said PCM-lines being a multiple number of the bitrate of the PCM-lines of the second (space division) switching stage. In the third switching stage (B2) all major switching groups have access to all PCM-lines of the second switching stage (B1) in the incoming direction, whereas in the outgoing direction acess is provided to the individual switching groups of the first switching stage (A). For adaptation of the faster third switching stage (B2) to the slower stages (A and B1) each major switching group (GG) is equipped with the necessary bitrate converters.

7 Claims, 1 Drawing Figure

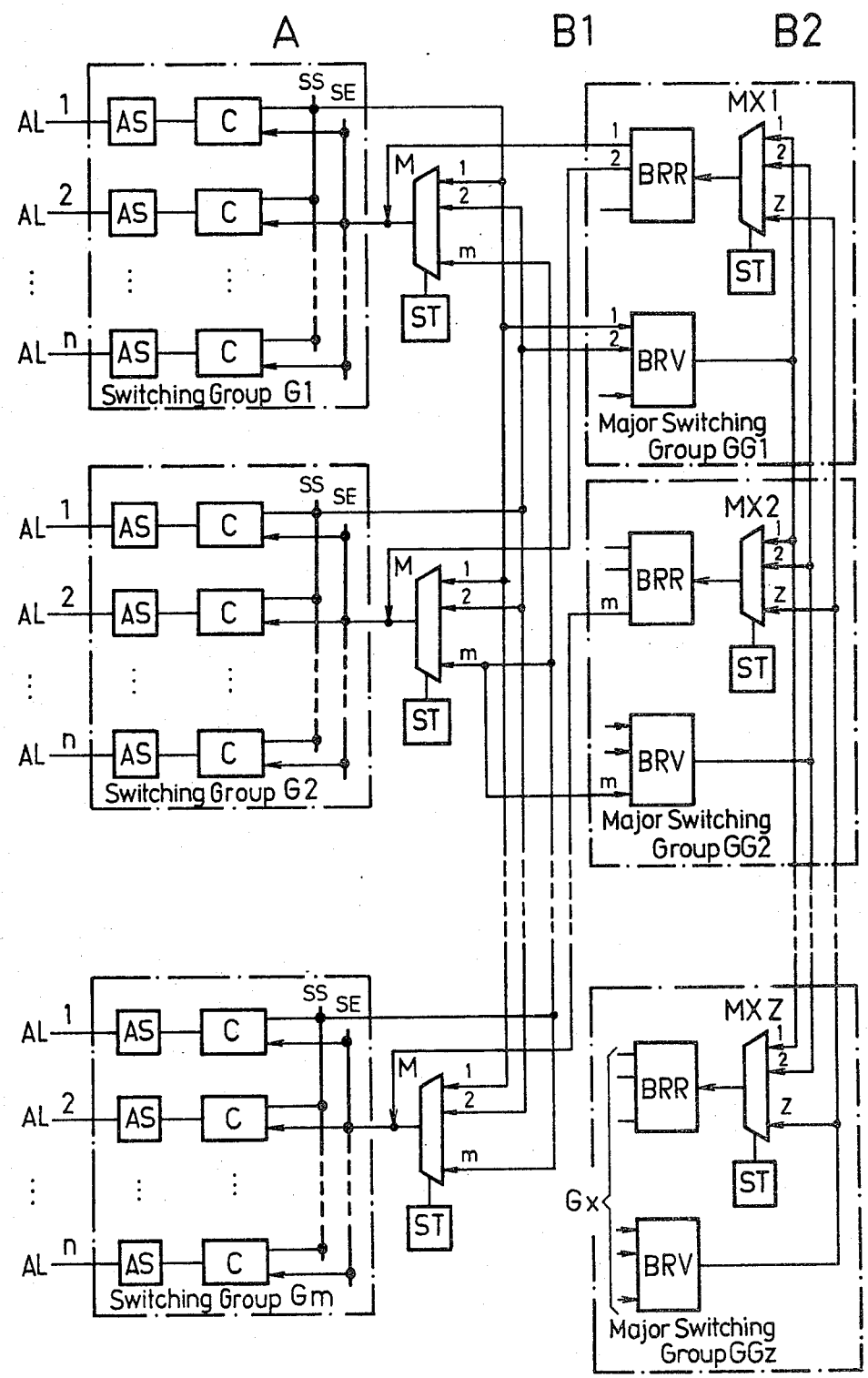

TELECOMMUNICATION SWITCHING NETWORK HAVING A MULTISTAGE REVERSED TRUNKING SCHEME

BACKGROUND OF THE INVENTION

Switching networks are used for connections between terminals in telecommunication switching systems. Two types of switching connections are distinguished, i.e. the space and the time division type. Space division uses for this purpose switching elements which are operated temporarily, whereas a periodically recurring pulsephase or time slot is assigned to a time-division connection.

Switching networks for pulse code modulation (PCM) using both time and space division switching are state of the art. The number of the switching stages depends on the size of the switching network, i.e. on the amount of traffic to be handled and the design of the switching network.

There are two types of trunking schemes, the elongated trunking scheme with terminals on both sides, and the reverse trunking scheme with all terminals on one side of the switching network. Switching networks of the latter type are distinguished by a nearly perfect availability of the outgoing lines. Such a switching network is disclosed for example in Reports on Telephone Engineering VI (1970) 1/2 published by Siemens AG, Berlin and Munich, West Germany, pp. 28 to 33.

If as a first stage in a PCM time-division multiplex switching network the time-division type is used, the number of terminals to be connected to a transmitting and a receiving highway is limited because of transmission and teletraffic reasons. If additional terminals are to be connected to the switching network, the first state is divided up into several switching groups, whereby connections between terminals of different switching groups are switched via a second stage. Since the capability of the second switching stage is also limited, it is useful to divide up the switching groups into major switching groups, whereby connections between the major switching groups are switched via a third switching stage, etc.

A multistage PCM switching network with space division and time division switching for use as a transit exchange is disclosed in the German patent application Ser. No. AS 24 15 367 either as a switching network of the elongated (FIG. 2) or of the reversed (FIG. 1) trunking scheme. By the use of combined space division and time division switching stages better traffic conditions can be attained, but the technical equipment per PCM-line is relatively high because of the individual information stores. Furthermore a multistage switching network consisting merely of time division switching stages with a reversed trunking scheme is disclosed in each of the German patent application Nos. AS 24 54 090 and OS 24 54 144, whereby the latter patent application is identical with the U.S. Pat. No. 4,025,725 of May 24, 1977.

It is an object of the invention to provide a PCM switching network consisting of time and space division switching stages, whereby the individual switching stages are arranged in such a manner that their qualities are used optimally, although the technical equipment remains small.

SUMMARY OF THE INVENTION

According to the principle of the invention, the foregoing and other objects are achieved in a switching network characterized in that it is constructed as a pulse code modulation (PCM) time-division multiplex switching network with a second (space-division) switching stage consisting of a number of PCM-lines (highways) equal to the number of switching groups within one major switching group, whereby each transmitting highway of a switching group of the first (time-division) switching stage is connected to the respective PCM-line (highway) of the second (space-division) switching stage, that all PCM-lines (highways) of said switching stage are connected to a group individual multiplexer having access to the receiving highway of the concerning group of the first (time-division) switching stage via an output of said multiplexer and that the third (space-division) switching stage is connected in the incoming direction with the transmitting and in the outgoing direction with the receiving highways of the individual switching groups of the first (time-division) switching stage.

The switching of connections between the terminals connected to the first (time-division) switching stage is performed either via the second (space-division) switching stage or the parallel connected third (space-division) switching stage. An easy expandability can be attained by this set up, since with small exchanges only a second (space-division) switching stage is used and the third (space-division) switching stage being necessary in case of expansion to more than one major switching group.

A further development of the invention is characterized in that the third (space division) switching stage is formed by a secondary PCM-system, whereby its bitrate is a multiple number of the bitrate of the first and second switching stages and the interface for the input and output lines formed by bitrate converters. By increasing the bitrate of the third switching stage, said stage can be designed to be able to handle the complete traffic of the second switching stage. Thus follows an effective duplication of the possible connections between the individual switching groups of the first switching stage.

A further development of the invention is characterized by the combination of several groups of the first (time-division) switching stage into one major switching group and the third (space-division) switching stage being formed by a number of PCM-lines corresponding to the number of major switching groups and by all PCM-lines of the third (space-division) switching stage being connected to a major switching group individual multiplexer. The design of the third (space division) switching stage including the multiplexer is similar to the second (space-division) switching stage, thus follows equal control structures for both switching stages.

A further development of the invention is characterized in that the multiplexers of the second and third (space-division) switching stages are each equipped with a control memory which has the same number of storage positions as time slots are within a cycle or frame, whereby the number of the switching group or major switching group of the respective time slot carrying the PCM word assigned to a switching group or major switching group is stored in the storage position of the control memory of the respective multiplexer. This keeps the technical means in the equipment of the second and third switching stages low, since no time slot transposition is necessary.

A further development of the invention is characterized in that the multiplexers of the second and third (space-division) switching stages are additionally equipped with a memory for the transposition of the PCM-words to different time slots. By the use of said memory a space division switching stage can be expanded to a combined space/time division switching stage, whereby better traffic handling capabilities can be attained by avoiding the use of the same time slot within all switching stages (danger of blocking).

A further development of the invention is characterized in that the PCM-lines of the second (space-division) switching stage of each major switching group are connected to the bitrate converters of several major switching groups. By this measure a higher reliability can be attained, since although the traffic handling capacity is reduced by the breakdown of a multiplexer in one of the two (space division) switching stages, the availability is still fully maintained.

Further developments of the invention result from the other claims.

BRIEF DESCRIPTION OF THE DRAWING

The invention will now be discussed with reference to a description of a preferred embodiment and the accompanying drawing.

DETAILED DESCRIPTION OF A PREFERRED EMBODIMENT

The multistage switching network shown herein is formed by the time division switching stage A and both the space division switching stages B1 and B2. The time division switching stage A consists of switching groups G1 to Gm, whereby a number of terminal lines AL1 to ALn are connected to each of the switching groups. These terminal lines AL are ordinary analog (audio frequency) or so-called single channel (digital) lines, for example subscriber lines, trunks to analog exchanges, lines to operators positions, etc. Each of these terminal lines AL is connected to an individual terminal circuit AS containing equipment for feeding, for the recognition of the line condition (loop open, loop closed), etc. Beside said equipment, a two/four-wire unit for dividing up the two-wire terminal line into an incoming and an outgoing branch is used, whereby a coder is connected to the outgoing branch and a decoder is connected to the incoming branch both of a codec C. Sand codec C is a so-called A/D-(analog/digital) and D/A-(digital/analog) converter for the transformation of the analog signals into PCM-words and vice versa. Furthermore codec C contains a register consisting of two storage positions for the storage of the assigned time slot addresses for the present connection in both the outgoing and incoming directions. A time slot address generator is used either per switching group or per codec C and each codec has a device for comparing the position of the counter of the time slot address generator with the content of both time slot address storage positions of codec C. The counter has as many counting steps as there are time slots within one cycle or frame, for example 32. The outgoing line of codec C is connected to a transmitting highway SS and the incoming line of codec C is connected to a receiving highway SE. Each switching group is equipped with an individual pair of highways SS and SE, thus forming the switching stage A, consisting of switching groups G1 to Gm. Using a word length of eight bit of the individual PCM-words the bitrate on both highways is 2.048 Mbit/s.

Switching stage B1 is formed by a number of PCM-lines whereby for each switching group G1 to Gm one PCM-line is provided, which means that the switching stage B1 is formed by m-PCM-lines. To each individual PCM-line the transmitting highway SS of the concerning switching group is connected. To all PCM-lines of switching stage B1 a switching group individual multiplexer M having m-inputs is connected. Each of these multiplexers M scan simultaneously and in parallel the same time slot of all switching groups G, the output of each is connected to the receiving highway SE of the concerning switching group G. Each multiplexer M is equipped with a control memory having a storage position for each time slot within one frame or cycle (32) and which is used for storing the switching group number. This information is used to mark the concerning switching group G and the PCM-line at the input of multiplexer M using a time slot carrying PCM-words assigned to the respective switching group associated with the respective multiplexer M. In the control memory the respective switching group number is stored in the storage position of the concerning time slot. This operation applies to both transmitting directions in the same way. Furthermore each multiplexer M may be equipped with a not-shown output memory having a storage position for each time slot for storing a PCM-word. It is used for transposition of the PCM-words to other time slots, if in either switching groups G the same time slot cannot be used for the same connection. For addressing the storage positions of both memories each multiplexer M is equipped with a special device for the generation of the time slot addresses.

All connections between terminal lines AL of the same switching group are performed basically via switching stage B1 in the same way as connections between termnal lines of different switching groups.

If only one switching group G exists, a common highway is used instead of the highway pairs SS and SE; a switching stage B1 is not necessary in this configuration.

It is also possible to connect a PCM-trunk line to the PCM-switching network leading to another PCM-exchange. This is performed by the connection of the incoming and outgoing branch of the trunk line to the transmitting respectively to the receiving highway SS respectively SE of one switching group G, to which no additional terminal sets AS are to be connected. Each of both branches of the PCM-trunk line is to be equipped with a signal converter and a delay stage (time slot converter).

The number of switching groups G to be connected to a common switching stage B1 is limited because of technological and traffic handling reasons. If additional switching groups G should be connected to the PCM-switching network, a number of switching groups G1 to Gx are attached to a major switching group GG of the second space division switching stage B2. The set up of said switching stage B2 is very similar to that of switching stage B1. Switching stage B2 consists in the same manner of a number of PCM-lines whereby as many PCM-lines exist as major switching groups GG. To each of these PCM-lines a major switching group individual multiplexer MX1 to MXz having each z-inputs is connected. The transmitting rate on these PCM-lines of switching stage B2 is not 2.048 Mbit/s as at switching stage B1, but a multiple value, for example 8,192 Mbit/s.

This means that between switching stages B1 and B2 a bitrate conversion has to be performed (secondary PCM-system). This is achieved by the bitrate converters, BRV (forward direction) and BRR (backward direction). In the assumed example 128 time slots can be handled instead of 32 within the same time. This means that four switching groups G form one major switching group GG in this example. The transmitting highways SS of each of the four switching groups G are connected to the bitrate converter BRV of the concerning major switching group GG. For the opposite direction, the bitrate converter Brr is connected to the output of the multiplexer MX of a major switching group, whereby one output of the bitrate converter BRR is parallel connected to the output of the multiplexer M of the respective switching group G. The multiplexer MX of each major switching group GG is designed in the same manner as the multiplexer M of the switching group G, i.e. it has z-inputs to which the PCM-lines of the switching stage B2 are connected. Each multiplexer MX scans simultaneously and in parallel the same time slot of all major switching groups.

The bitrate converters BVR and BRR are constructed as follows: They consists each of two parallel connected 8 bit shift registers. At the bitrate converter BRV the PCM-word is shifted into the receiving shift register with a bitrate of 2.048 Mbit/s, as soon as it is completely in the register it is tranferred in parallel into the transmitting shift register and subsequently transmitted with a bitrate of 8,192 Mbit/s. The composition of the PCM-words of this secondary PCM-system (switching stage R2) can either be performed by transferring to the switching stage B2 either four PCM-words from the same major switching group GG in succession or four PCM-words of different major switching groups GG. The latter operation causes a lesser traffic congestion in the switching network in case of a malfunction of a multiplexer MX.

The conversion of the data stream of 8,192 Mbit/s into four individual data streams each of 2,048 Mbit/s, is performed in the same way by two parallel connected shift registers, whereby the receiving shift register is loaded with a PCM-word from the secondary PCM-system, which is then taken over into the transmitting shift register and is subsequently transmitted with a bitrate of 2.048 Mbit/s.

Each multiplexer MX is equipped with a control memory ST having a storage position for each time slot (128) within a frame or cycle for storing the major switching group number. In this manner the major switching group GG and thus the PCM-line at the input of the multiplexer MX is marked using a time slot carrying PCM-word assigned to the respective major switching group GG, which is allocated to the concerning multiplexer MX. In the control memory the number of the major switching group is stored in the storage position of the respective time slot. This operation applies in the same way to both transmission directions. Furthermore the multiplexer MX can be equipped with an output memory having a storage position for each time slot within a cycle for storing one PCM-word. It is used for the transposition of PCM-words to other time slots, if in either major switching group the same time slot cannot be used for a connection. The addressing of the storage positions of both memories is performed by a special generator for the generation of the time slot addresses, whereby each multiplexer MX is equipped with such a generator.

The allotment of free time slots within the individual switching stages i.e. the path selection within the switching network, can be effected either by sub control units assigned to the individual switching groups G and major switching groups GG, whereby said units exchange the necessary data between each other, or by a common general control unit for all switching groups G and major switching groups GG. Since the path selection does not concern the subject of the invention, this feature (equipment for the performance of the path selection is a prerequisite) is, therefore, not mentioned in detail in this description. For the same reason, equipment for the synchronisation of the time slot address generators and the multiplexers M and MX is also assumed, since these features are necessary for the operation of the switching network. This equipment does not concern the subject of the invention.

In order to illustrate the functions of the individual units of the switching network, in the following is described the set-up and the switching of a connection between two terminal lines AL.

1. Switching of two terminal lines connected to switching groups G of the same major switching group GG.

It is assumed that, for example, terminal line AL1 of switching group G1 desires a connection to terminal line AL2 of switching group G2. By analysing the dial information transmitted via terminal line AL1 a not shown control unit recognizes the requested connection searches for a free time slot in both concerning switching groups G1 and G2.

First of all it is assumed that the same time slot is available in both switching groups G. This time slot is assigned to the concerning connection and the address of the time slot is stored in the registers of the codecs C of both terminal lines AL.

Besides this for the forward direction the number of switching group G1 is stored in the storage position of the assigned time slot within the control memory ST of multiplexer M of the switching group G2, the same ocurring for the backward direction, whereby the number of switching group G2 is stored in the control memory of the switching group G1.

If different time slots are used in both switching groups a time slot transposition is performed by the multiplexers.

2. Switching of two terminal lines connected to switching groups G of different major switching groups GG.

It is assumed that, for example, a connection is desired between terminal line AL1 of switching group G1 and a terminal line connected to a switching group Gx not shown in the drawing. After the recognition of the requested connection by a control unit, which is not shown, an available time slot is assigned by said control unit in both switching groups G1 and Gx. It has to be considered that, because of the parallel connection of the inputs and outputs of the switching stage B2 to the inputs and outputs of the switching stage B1, the latter has not to be taken into consideration regarding the path selection. Within the switching stage B2 again optional time slots can be selected, since a time slot transposition can be performed by multiplexers MX.

We claim:

1. A multistage switching network having a reversed trunking scheme for four-wire switching of connections between terminal lines of a pulse code modulated (PCM) telecommunication exchange with time and spce division multiplex switching stages comprising:

a plurality of terminal lines, connected with individual termination circuits (AS), a first switching stage (A) with time division multiplex comprising a plurality of termination circuits (AS) each connected with an individual codec (C), said switching stage being formed by a plurality of individual switching groups (Gl to Gm) consisting of a number of said termination circuits and said codecs, and each switching group of said first switching stage being provided with an individual transmitting (SS) and receiving (SE) highway the latter connected to the output of a group individual multiplexer (M) and all codecs (C) of each respective switching group being connected to both highways (SS, SE), a plurality of major switching groups (GG1 to GGz) each being formed by a number of switching groups, a second switching stage (B1) with space division multiplex comprising a plurality of PCM-lines or highways equal to the number of switching groups (G1 to Gm) of said first switching stage forming one major switching group (GG), whereby each transmitting highway (SS) of one switching group (G) of the first switching stage (A) is connected to an individual PCM-line or highway of the second switching stage (B1) and all said PCM-lines or highways are connected to individual inputs of said multiplexers (M), a third switching stage (B2) with space division multiplex comprising a plurality of said major switching groups (GG1 to GGz) and consisting of a number of PCM-lines or highways equal to the number of said major switching groups which are connected for the incoming direction to the transmitting (SS) and in the outgoing direction to the receiving (SE) highways of the individual switching groups (G) of the first switching stage (A).

2. A multistage switching network according to claim 1 wherein the third switching stage (B2) comprises a secondary PCM-system using a bitrate with a multiple number of the bitrate of the first (A) and second (B1) switching stages and the interface between both said switching stages (A, B1) and the third switching stage (B2) is formed by major switching group individual bitrate converters (BRV, BRR), an individual bitrate converter being used for each of both directions.

3. A multistage switching network as in claim 2 wherein the third switching stage (B2) includes major switching group individual multiplexers (MX1 to MXZ), with all PCM-lines of said third switching stage (B2) connected to the individual inputs of all of said multiplexers whose output is connected to the input of the respective outgoing bitrate converter (BRR).

4. A multistage switching network as in claim 3 wherein the multiplexers (M, MX) of the second and third switching stages (B1, B2) are each equipped with a control memory (ST) each having the same number of storage positions as there are time slots within one cycle of frame, the number of the switching group respectively the number of the major switching group of the respective time slot carrying the PCM-word assigned to a switching group or major switching group is stored in the storage position of the control memory of the respective multiplexer.

5. A multistage switching network as in claim 4 wherein the multiplexers (M, MX) of the second and third switching stages, are each additionally equipped with a memory for the transposition of the PCM-words to different time slots.

6. A multistage switching network as in claim 5 wherein the PCM-lines of the second switching stage (B1) of a major switching group are connected to the bitrate converters (BRV) of several major switching groups (GG).

7. A multistage switching network as in claim 6 comprising the connection of a PCM-trunk line to the transmitting highway in the incoming direction and in the outgoing direction to the receiving highway of a switching group as one and only terminal line and an individual time delay stage and signal converter connected as an interface between the trunk line and the highways.

* * * * *